United States Patent
Cui et al.

(10) Patent No.: US 9,690,674 B2
(45) Date of Patent: Jun. 27, 2017

(54) METHOD AND SYSTEM FOR ROBUST PRECISION TIME PROTOCOL SYNCHRONIZATION

(75) Inventors: Baifeng Cui, Beijing (CN); Qingfeng Yang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 283 days.

(21) Appl. No.: 14/388,890

(22) PCT Filed: Mar. 30, 2012

(86) PCT No.: PCT/CN2012/073290
§ 371 (c)(1),
(2), (4) Date: Jan. 20, 2015

(87) PCT Pub. No.: WO2013/143112
PCT Pub. Date: Oct. 3, 2013

(65) Prior Publication Data
US 2015/0127978 A1    May 7, 2015

(51) Int. Cl.
*G06F 11/16* (2006.01)
*H04L 29/06* (2006.01)
*H04J 3/06* (2006.01)

(52) U.S. Cl.
CPC ...... *G06F 11/1679* (2013.01); *G06F 11/1604* (2013.01); *H04J 3/0641* (2013.01); *H04J 3/0667* (2013.01); *H04L 69/28* (2013.01)

(58) Field of Classification Search
USPC .......................................................... 714/15
See application file for complete search history.

(56) References Cited

U.S. PATENT DOCUMENTS

| 7,093,160 | B2 | 8/2006 | Lau et al. | |
| 7,447,931 | B1* | 11/2008 | Rischar | H04J 3/0697 368/46 |
| 7,613,212 | B1* | 11/2009 | Raz | H04J 3/0641 370/510 |
| 8,976,750 | B1* | 3/2015 | Pearson | H04W 56/0065 370/329 |
| 2004/0133690 | A1* | 7/2004 | Chauffour | H04L 29/06 709/229 |

(Continued)

FOREIGN PATENT DOCUMENTS

| WO | 2011032494 A1 | 3/2011 |
| WO | 2011/060965 A1 | 5/2011 |

OTHER PUBLICATIONS

International Telecommunication Union, "Precision time protocol telecom profile for frequency synchronization," ITU-T: Telecommunication Standardization Sector of ITU, G.8265.1/Y.1365.1 (Oct. 2010), 30 pages.

(Continued)

*Primary Examiner* — Kamini Patel
(74) *Attorney, Agent, or Firm* — Ericsson Inc.

(57) ABSTRACT

A method and system for maintaining clock synchronization in a communication network having multiple clocks are disclosed. According to one aspect, the invention provides a first precision time protocol (PTP) instance and second PTP service instance. Dynamic PTP parameters and tuning PTP parameters are periodically cloned from the first PTP service instance to the second PTP service instance substantially in real time.

21 Claims, 5 Drawing Sheets

(56) References Cited

U.S. PATENT DOCUMENTS

| | | |
|---|---|---|
| 2005/0117598 A1 | 6/2005 | Iijima et al. |
| 2009/0003195 A1* | 1/2009 | Pitchforth, Jr. ..... H04L 41/0659 370/218 |
| 2010/0098202 A1* | 4/2010 | Lai ................ H04J 3/0673 375/356 |
| 2010/0111113 A1* | 5/2010 | Wong ................ H04J 3/14 370/503 |
| 2010/0150288 A1 | 6/2010 | Zhu et al. |
| 2010/0153742 A1* | 6/2010 | Kuo ................ H04L 63/04 713/189 |
| 2010/0172453 A1* | 7/2010 | Cankaya ............ H04J 3/0641 375/355 |
| 2011/0029687 A1* | 2/2011 | Kirrmann ............ H04L 12/437 709/236 |
| 2011/0255546 A1* | 10/2011 | Le Pallec ............ H04J 3/0679 370/400 |
| 2012/0275501 A1* | 11/2012 | Rotenstein ............ H04J 3/0667 375/220 |
| 2013/0080817 A1* | 3/2013 | Mihelic ................ H04J 3/0667 713/401 |
| 2013/0227008 A1* | 8/2013 | Yang ................ G06F 1/12 709/204 |
| 2013/0227172 A1* | 8/2013 | Zheng ................ H04J 3/0641 709/248 |
| 2013/0235888 A1* | 9/2013 | Bui ................ H04J 3/0641 370/503 |
| 2014/0173331 A1* | 6/2014 | Martin ................ G06F 11/2002 714/4.11 |
| 2014/0281037 A1* | 9/2014 | Spada ................ H04L 69/28 709/248 |
| 2015/0222413 A1* | 8/2015 | Pietilainen ................ G06F 1/14 709/248 |
| 2015/0295669 A1* | 10/2015 | Chapman ............ H04L 5/0007 370/503 |
| 2015/0318941 A1* | 11/2015 | Zheng ................ H04J 3/0697 370/503 |
| 2016/0095075 A1* | 3/2016 | Bin Sediq ........... H04W 56/001 370/350 |
| 2016/0170437 A1* | 6/2016 | Aweya ................ G06F 1/12 713/503 |
| 2016/0170439 A1* | 6/2016 | Aweya ................ H04L 69/28 713/401 |
| 2016/0173267 A1* | 6/2016 | Zhang ................ H04L 7/0008 709/248 |

OTHER PUBLICATIONS

Ed R. Hinden, "Virtual Router Redundancy Protocol (VRRP)," Internet Society: Network Working Group, Standards Track RFC 3768 (Apr. 2004), 27 pages.

IEEE, "IEEE Standard for a Precision Clock Synchronization Protocol for Networked Measurement and Control Systems," IEEE Instrumentation and Measurement Society, Technical Committee on Sensor Technology (TC-9): New York, NY, IEEE Std 1588-2008 (Jul. 2008), 269 pages.

IEEE, "IEEE Standard Definitions of Physical Quantities for Fundamental Frequency and Time Metrology—Random Instabilities," IEEE-SA Standards Board, IEEE Standards Coordinating Committee 27 on Time and Frequency: New York, NY, IEEE Std 1139-2008 (Feb. 2009), 35 pages.

PCT International Search Report from corresponding application PCT/CN2012/073290.

Abstract for KR200744523A, Aug. 1, 2011; 3 pages.

Takahide Murakami et al.: A Master Redundancy Technique in IEEE 1588 Synchronization with a Link Congestion Estimation; Sep. 27, 2010; 6 pages.

English translation of CN 101383688 A; Mar. 11, 2009; 5 pages.

Sven Meier et al.: IEEE 1588 applied in the environment of high availability LANs; Oct. 1-3, 2007; 6 pages.

* cited by examiner

METHOD AND SYSTEM FOR ROBUST PRECISION TIME PROTOCOL SYNCHRONIZATION

TECHNICAL FIELD

The present invention relates to a method and system for maintaining clock synchronization in a communication system.

BACKGROUND

Communication systems include a wide assortment of devices such as switches, routers, base stations, transceivers, etc., distributed over a wide geography, connected by a network such as an Ethernet network and/or a wireless network. At least some of these devices must be synchronized in time for correct operation of the system. A protocol for time synchronization of disparate elements in a distributed electronic system is promulgated by the Institute of Electrical and Electronic Engineers (IEEE) is known as IEEE Standard 1588, and is referred to herein as the Precision Time Protocol (PTP). The PTP is implemented to achieve clock accuracy in the sub-microsecond range, making it suitable for measurement, control, and communication systems.

The challenge addressed by the PTP is to synchronize networked devices with a master clock providing a precise time, where the local clocks of the networked devices may not be as accurate as the master clock. Basically, the master clock periodically broadcasts synchronization packets which contain a time stamp to the slave devices. Based on the time stamp and by means of its own local clock, a receiving (slave) device can calculate the time difference between its local clock and the master clock, and also determine a packet propagation time. The slave can then correct its clock based on the propagation time and the time difference, to achieve synchronization of the slave clock to the master clock.

To automatically configure a network for time synchronization, each node executes a "best master clock" (BMC) algorithm to determine the best clock in a domain (subnetwork) of the network. The BMC algorithm is run periodically, so that the PTP can account for changes in the configuration of the network due to the removal, addition, or repositioning of a network device.

In a typical configuration, a network may include a master clock and subordinate PTP service instances distributed in the network but connected to the master clock. The master clock is a clock having high accuracy and precision. A PTP service instance is clock that may be synchronized to the master clock, and in turn, provides time stamps to other network devices that may be further away from the master clock than the PTP service instance. More than one PTP service instance can serve the same subdomain of a network. For example, two PTP service instances may be provided to achieve redundancy, so that if one PTP service instance fails or becomes inaccessible due to a link fault, the remaining PTP service instance will continue in operation to provide time stamps to the devices in the subdomain.

Thus, in one known configuration multiple PTP service instances are running simultaneously. These active PTP service instances may be all located in a single node or located in different nodes. A challenge to having multiple active PTP service instances is the relative complexity and cost of such a configuration. In another known configuration, there may be one active PTP service instance and one or more inactive PTP service instances. If a fault disables service of the active PTP service instance, an inactive PTP service instance may be selected to replace the formerly active PTP service instance. The active and inactive PTP service instances can be located in the same node or in different nodes. A challenge to having inactive backup PTP service instances is that a long time is required to bring an inactive PTP service instance into an active and synchronized state. This restoration time may depend upon the network environment and local hardware, making the restoration time unpredictable.

Thus, it is desirable to have an arrangement that provides PTP service instance redundancy without having multiple active PTP service instances for a single domain, and having relatively fast switchover to another PTP service instance when an active PTP service instance fails.

SUMMARY

The present invention advantageously provides a method and system for maintaining clock synchronization in a communication network having multiple clocks. According to one aspect, the invention provides a first precision time protocol (PTP) service instance and a second PTP service instance. Dynamic PTP parameters and tuning PTP parameters are periodically cloned from the first PTP service instance to the second PTP service instance substantially in real time.

According to another aspect, the invention provides a communication system having a first PTP service instance and a second PTP service instance. The first PTP service instance has static parameters, dynamic parameters and real time tuning parameters. The second PTP service instance has dynamic parameters and real time tuning parameters received from the first PTP service instance periodically at subsequent times.

According to yet another aspect, the invention provides a method for maintaining clock synchronization in a communication network having at least a first PTP clock instance, a second PTP clock instance and a master clock. Initially, the first PTP clock instance is synchronized to the master clock. Periodically, dynamic PTP parameters and real time tuning parameters of the first PTP clock instance are copied to the second PTP clock instance.

According to still another aspect, the invention provides a network node having a memory arranged to store dynamic precision time protocol, PTP, parameters and real-time PTP tuning parameters. An interface is arranged to receive the dynamic PTP parameters and real-time PTP tuning parameters, and receive an activation message. The network node also includes a local clock. The network node is arranged to activate a backup PTP service instance and synchronize the local clock with a master clock upon receipt of the activation message. The backup PTP service instance is based at least in part on the dynamic PTP parameters and the real-time PTP tuning parameters.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Before describing in detail exemplary embodiments that are in accordance with the present invention, it is noted that the embodiments reside primarily in combinations of apparatus components and processing steps related to maintaining clock synchronization in an electronic system such as a communication network. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Figure 1:
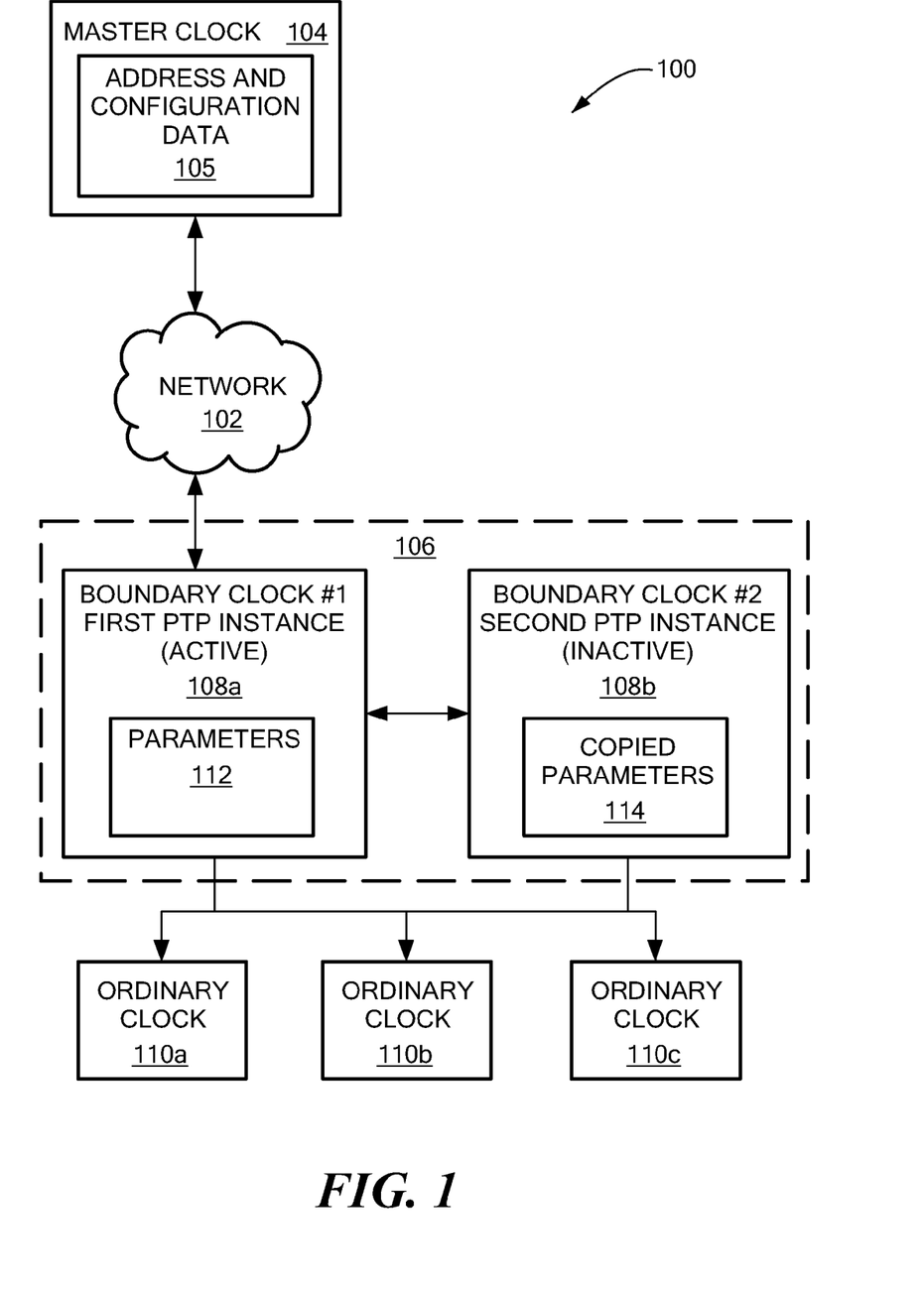
FIG. 1 is a block diagram of an exemplary communication system that implements precision time protocol (PTP) according to principles of the present invention.

As used herein, relational terms, such as "first" and "second," "top" and "bottom," and the like, may be used solely to distinguish one entity or element from another entity or element without necessarily requiring or implying any physical or logical relationship or order between such entities or elements Referring now to the drawing figures, in which like reference designators denote like elements, there is shown in FIG. 1 an exemplary communications network 100 having an intermediary network 102 that communicatively couples a master clock 104 to a protection group 106. The master clock 102 provides a relatively precise clock used to synchronize one or more clocks of the protection group 106. In FIG. 1, the protection group 106 is shown having two PTP service instances 108a and 108b, referred to herein collectively as PTP clock or service instances 108. More or less than two PTP service instances 108 may be included in a protection group 106. The PTP service instances 108 may be included in the same node or may be located in different nodes. Also, the PTP service instances may share the same network address or have different network addresses.

In the discussion that follows, the PTP service instance 108a is a primary PTP service instance that is active prior to a fault, whereas the PTP service instance 108b is a backup PTP service instance that is inactive prior to the fault. The clock of the active PTP service instance 108a is synchronized to the master clock 104 and is periodically re-synchronized to the master clock 104. The master clock 104 may maintain a database of addresses and configuration data 105 of the various PTP service instances served by the master clock 104.

The active PTP service instance 108a serves one or more clocks that may be within or outside the protection group 106. For example, in one embodiment, the PTP service instances 108a and 108b are on the boundaries of a subdomain of the network 100, and they serve ordinary clocks 110a, 110b, and 110c. Note that a protection group 106 may include ordinary clocks as well as boundary clocks. Thus, although the ordinary clocks 110a, 110b, and 110c are shown outside of the protection group 106, it is contemplated that in an alternative embodiment, one or more of these ordinary clocks could be included in the protection group 106.

In FIG. 1, the first PTP service instance 108a has parameters 112 and the second PTP service instance has parameters 114. The parameters 114 are copied from some or all of the parameters 112. Each PTP service instance may have at least three categories of parameters: (1) static PTP parameters, (2) dynamic PTP parameters, and (3) real time tuning parameters. In one embodiment, the static PTP parameters of the backup PTP service instance may be copied at an initialization time from the primary PTP service instance. In another embodiment, the static PTP parameters of the backup PTP service instance may be configured independently.

The static PTP parameters may include, for example, clock identity, clock quality, priority and domain number. A more complete list may be found in the IEEE Standard 1588-2008. A partial list includes: defaultDS (clockIdentity, clockQuality, priority1, priority2, domainNumber, slaveOnly, twoStepFlag, numberPorts) portDS (portIdentity, delayMechanism, versionNumber, announce Receipt Timeout), for multicast adding-(announce Interval, sync Interval, DelayReqInterval), for unicast adding-(Query Interval, duration Period, announce/sync/delayResp Inter message Period, sync/delayResp receipt Timeout, unicast master address).

The dynamic PTP parameters may include, for example PTP clock type and PTP port state. A more complete list may be found in the IEEE Standard 1588-2008. A partial list includes: parentDS (parentPortIdentity, parentStats, observedParent OffsetScaledLogVariance, observedParentClockPhaseChangeRate, grandmasterIdentity, grandmasterClockQuality, grandmasterPriority1, grandmasterPriority2) foreignMasterDS (foreignMasterPortIdentity, foreignMasterAnnounceMes sages), currentDS (stepsRemoved, offsetFromMaster, meanPathDelay) timePropertiesDS (currentUtcOffset, currentUtcOffsetValid, leap59, leap61, timeTraceable, frequencyTraceable, ptpTimescale, timeSource).

The real time tuning parameters may include phase offset, frequency offset and frequency drift. A more complete list may be found in the IEEE Standard 1588-2008.

In addition to these parameters, the master clock 104 will store the Internet protocol (IP) address and mask, the Media Access Control (MAC) address, Virtual Local Area Network (VLAN) identifier, clock identity, port identity, duration period, and announce/sync/delayResp inter-message period for the active PTP service instance.

In one embodiment, the parameters 112 of the active PTP service instance 108a are copied to the inactive PTP service instance 108b in stages. During an initialization phase, shortly after the active PTP-instance 108a is synchronized to the master clock 104, static parameters of the active PTP service instance 108a are copied to the inactive PTP service instance 108b. In another embodiment, the static PTP parameters of the inactive PTP service instance 108b are configured independently, e.g., manually by a user. Subsequently, either periodically or from time to time, dynamic PTP parameters and real time tuning parameters of the active PTP service instance 108a are copied to the inactive PTP service instance 108b. In one embodiment, the copying is directly from the active PTP service instance 108a to the inactive service instance 108b, i.e., without involvement by the master clock 104. In another embodiment, the master clock 104 can act as the intermediary. By frequently updating the parameters of the inactive PTP service instance 108b, substantially less time is required to bring the inactive PTP service instance 108b to a fully active and synchronized state when desired.

Figure 2:
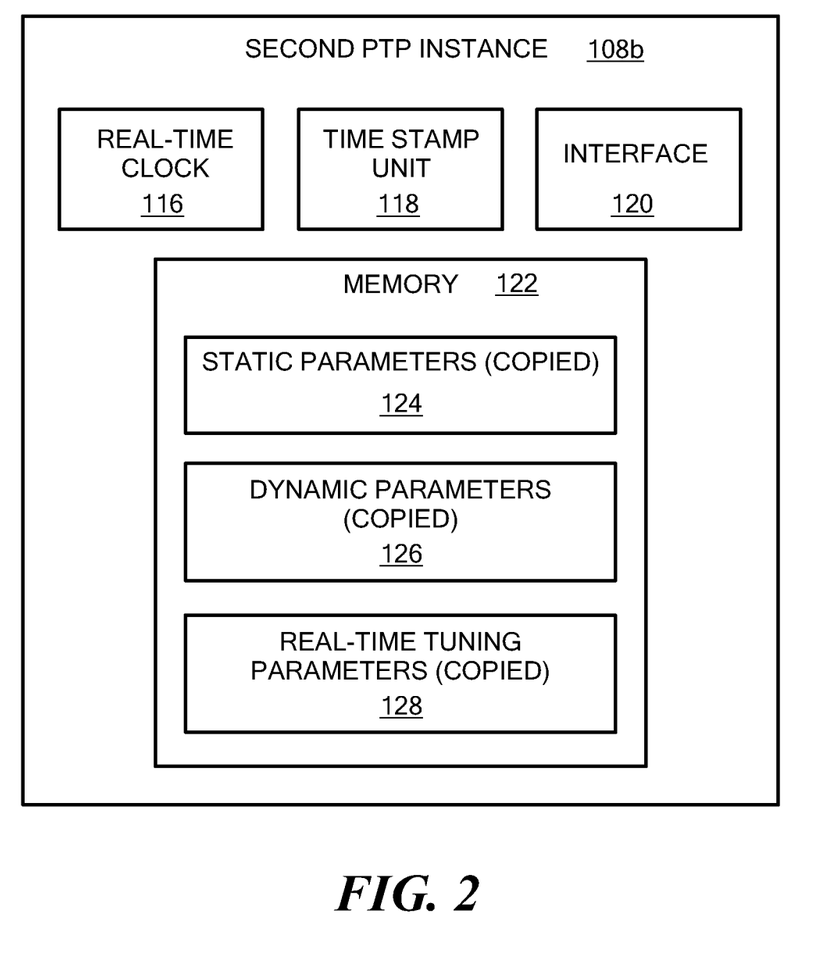
FIG. 2 is a block diagram of an exemplary PTP service instance that implements PTP according to principles of the present invention.

FIG. 2 is a block diagram of an exemplary PTP service instance that implements a precision time protocol according to principles of the present invention. The second PTP service instance 108b may include a real time clock 116, a time stamp unit 118, an interface 120 and a memory 122. The real time clock 116 is a local clock that is synchronized to the master clock 104 when the second PTP service instance 108b is active. The time stamp unit is implemented in hardware and/or software to place a time stamp indicating the current time into a packet for transmission to ordinary clocks in the subdomain served by the PTP service instance 108b. The interface 120 transmits and receives packets exchanged by the PTP service instance 108b and other devices in the network. The memory 122 stores data including static parameters 124, copied dynamic parameters 126 and copied real time tuning parameters 128.

Table 1 shows exemplary static PTP parameters that are configured in the first PTP service instance 108a. The parameters are configured for each slave device that relies on the PTP service instance 108a for PTP timing. Reference to "1588" in Table 1 indicates reference to the IEEE Standard 1588-2008.

TABLE 1

| No. | Parameters | Value | Note |
| --- | --- | --- | --- |
| 1 | twoStepFlag | {FALSE, TRUE} | |
| 2 | clockIdentity | based on EUI 64 format | |
| 3 | numberPorts | 1 | |
| 4 | clockQuality | {80-255} | Default 255 |
| 5 | priority1 | {0-255} | |
| 6 | priority2 | {0-255} | |
| 7 | domainNumber | {4-23} | Default 4 |
| 8 | slaveOnly | TRUE | |
| 9 | portIdentity | based on EUI 64 format | |
| 10 | IP Address | | Per port |
| 11 | Mac Address | | Per port |
| 12 | delayMechanism | {01, FE} | '01' for a twoway slave, and 'FE' for a oneway slave |
| 13 | versionNumber | 2 | |
| 14 | announce Receipt Timeout | 2 | |
| 15 | announce Interval | Refer to 1588 | Multicast only |
| 16 | DelayReqInterval | Refer to 1588 | Multicast only |
| 17 | Query Interval | Refer to 1588 | Unicast only |
| 18 | announce/sync/delayResp Inter message Period | Refer to 1588 | Unicast only |
| 19 | sync/delayResp receipt Timeout | Refer to 1588 | Unicast only |
| 20 | Unicast master address | Refer to 1588 | Unicast only |

Table 2 shows exemplary parameters that are configured at the master clock 104.

TABLE 2

| No | Parameters | Value | Note |
| --- | --- | --- | --- |
| 1 | Grandmaster | True | |
| 2 | Unicast slave address | Refer to 1588 | Unicast |

TABLE 2-continued

| No | Parameters | Value | Note |
| --- | --- | --- | --- |
| 3 | GrantedAnnounceInterval | Refer to 1588 | Unicast only |
| 4 | GrantedAnnounceDuration | Refer to 1588 | Unicast only |
| 5 | GrantedSyncInterval | Refer to 1588 | Unicast only |
| 6 | GrantedSyncDuration | Refer to 1588 | Unicast only |
| 7 | GrantedDelRespInterval | Refer to 1588 | Unicast only |
| 8 | GrantedDelRespDuration | Refer to 1588 | Unicast only |

Table 3 includes exemplary parameters of a PTP protection group which specifies the primary and back PTP service instances. The "revertible" parameter indicates whether the system will automatically revert back to the primary PTP service instance from the backup PTP service instance when the primary PTP service instance recovers from a fault. When the "revertible" value is no, reversion must be performed manually. The WTR parameter indicates whether the reversion waits for a period of time after the primary PTP service instance recovers from the fault. The refresh timer is a value that specifies how often the dynamic PTP parameters and real time tuning parameters are copied from the current PTP service instance to the back-up service instance. The value of the refresh timer may be based on network traffic load and time efficiency.

TABLE 3

| No. | Parameter Name | Value |
| --- | --- | --- |
| 1 | Group ID | 1 |
| 2 | Revertible | YES |
| 3 | WTR Unit: seconds | 20 |
| 4 | Primary Configured | PTP-1 |
| 5 | Active | PTP-1 |
| 6 | Secondary Configured | PTP-2 |
| 7 | Refresh Timer Unit: seconds | 60 |

Figure 3:
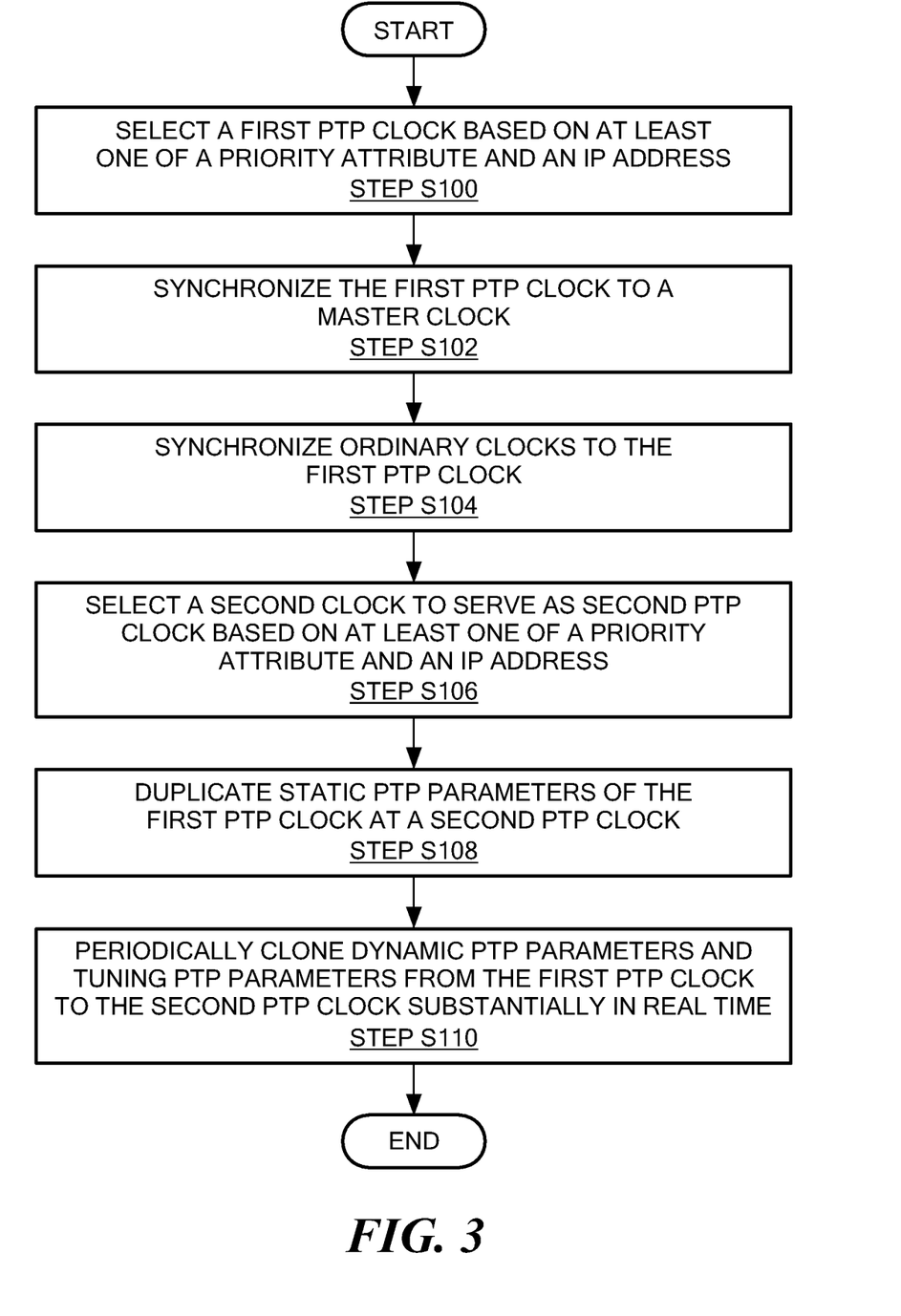
FIG. 3 is a flowchart of an exemplary process for synchronization of PTP clock instances according to principles of the present invention.

An exemplary process for synchronization of PTP service instances is described with reference to FIG. 3. A first PTP service instance 108a is selected based on one of a priority attribute and an Internet protocol (IP) address (step S100). Thus, the available devices that may serve as an active or standby PTP service instance may be identified by an IP address and associated with a priority assigned to the device. The election of a PTP service instance to be an active PTP service instance may be performed according to a virtual router redundancy protocol (VRRP).

The device selected to be the active first PTP clock instance 108a is synchronized to the master clock 104 (step S102). The ordinary clocks 110 and any other clocks served by the first PTP clock instance 108a are then synchronized to the clock of the first PTP clock instance 108a (step S104).

A second PTP service instance 108b is selected to be a backup PTP service instance based at least in part on an IP address and/or a priority attribute (step S106). At an initialization time, when the first PTP clock instance 108a is being placed into service, the static PTP parameters of the first PTP clock instance 108a may be copied to the second PTP clock instance 108b or may be configured independently (step S108).

From time to time after initialization, the dynamic PTP parameters and real time tuning parameters of the first PTP service instance 108a are copied to the second PTP service instance 108b (step S110). By continually updating the dynamic PTP parameters and real time tuning parameters of the second PTP service instance 108b, the time required to synchronize the second PTP service instance 108b in the event of a fault of the first PTP service instance 108a is greatly reduced. For example, a reduction of orders of magnitude can be achieved. In one embodiment, a resynchronization of several seconds may be achieved applying principles of the present invention as compared to a resynchronization time of an hour or more using known methods.

Figure 4:
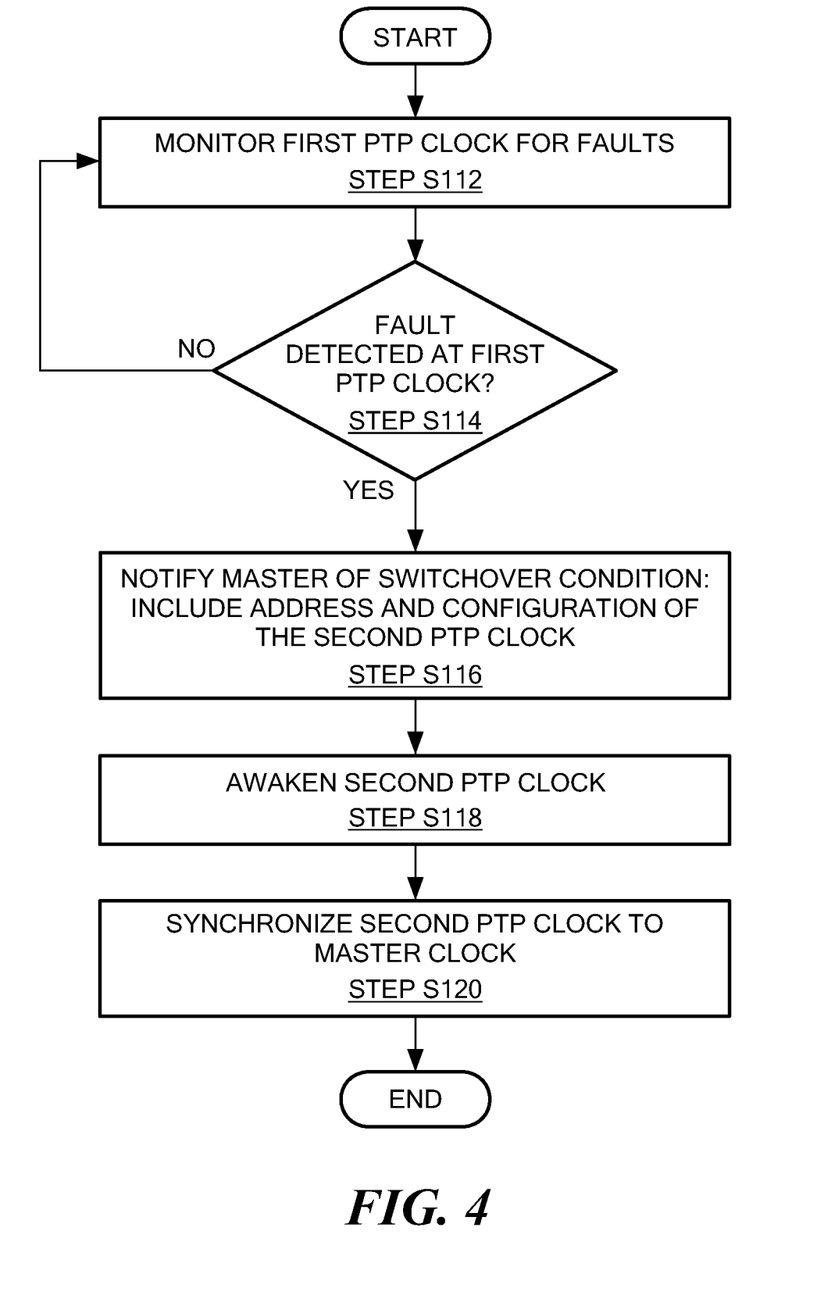
FIG. 4 is a flowchart of an exemplary process for switching from a first PTP service instance to a second PTP service instance according to principles of the present invention.

An exemplary process for switching from a first PTP service instance to a second PTP service instance is described with reference to FIG. 4. The operation of the first PTP service instance 108a is monitored to detect a fault (step S112). If a fault is detected, (step S114), the master clock 104 is notified by the first PTP service instance 108a of a switchover condition. The notification may include an address and configuration data of the second PTP service instance 108b selected as the backup PTP service instance (step S116). Also, other candidate backup PTP service instances may be notified of the fault by an alarm message.

The selection of the backup PTP service instance 108b may be based on a priority of each of a plurality of candidate backup PTP service instances that include PTP service instance 108b. If two PTP service instances have the same highest priority, then the one with the higher Internet protocol (IP) address may be chosen. If both also have the same IP address, then the one with the higher MAC address may be chosen. Once chosen, the master clock 104 awakens or activates the second PTP service instance 108b (step S118) by sending an activation message. In an alternative embodiment, it is the first PTP service instance 108a that activates the second PTP service instance using the activation message. The second PTP service instance 108b is then synchronized to the master clock 104 (step S120). Note that the election of a backup PTP service instance may occur before a fault condition or in response to a fault condition.

In some embodiments, a user can manually switchover to the second PTP service instance. In other embodiments, the switchover is automatic. Note also, that signaling between the master clock 104 and PTP service instances 108a and 108b may be by special signaling messages or by data packets that conform to the precision time protocol. For example, in the event of a fault, a message or packet may be sent to the master clock 104 to maintain the status of the master clock for some period of time prior to initiation of switchover from the primary PTP service instance to the backup PTP service instance. Also, in the case of multiple PTP service instances in multiple locations, the master clock may have the addresses of each PTP service instance and designate which PTP service instance is active.

Figure 5:
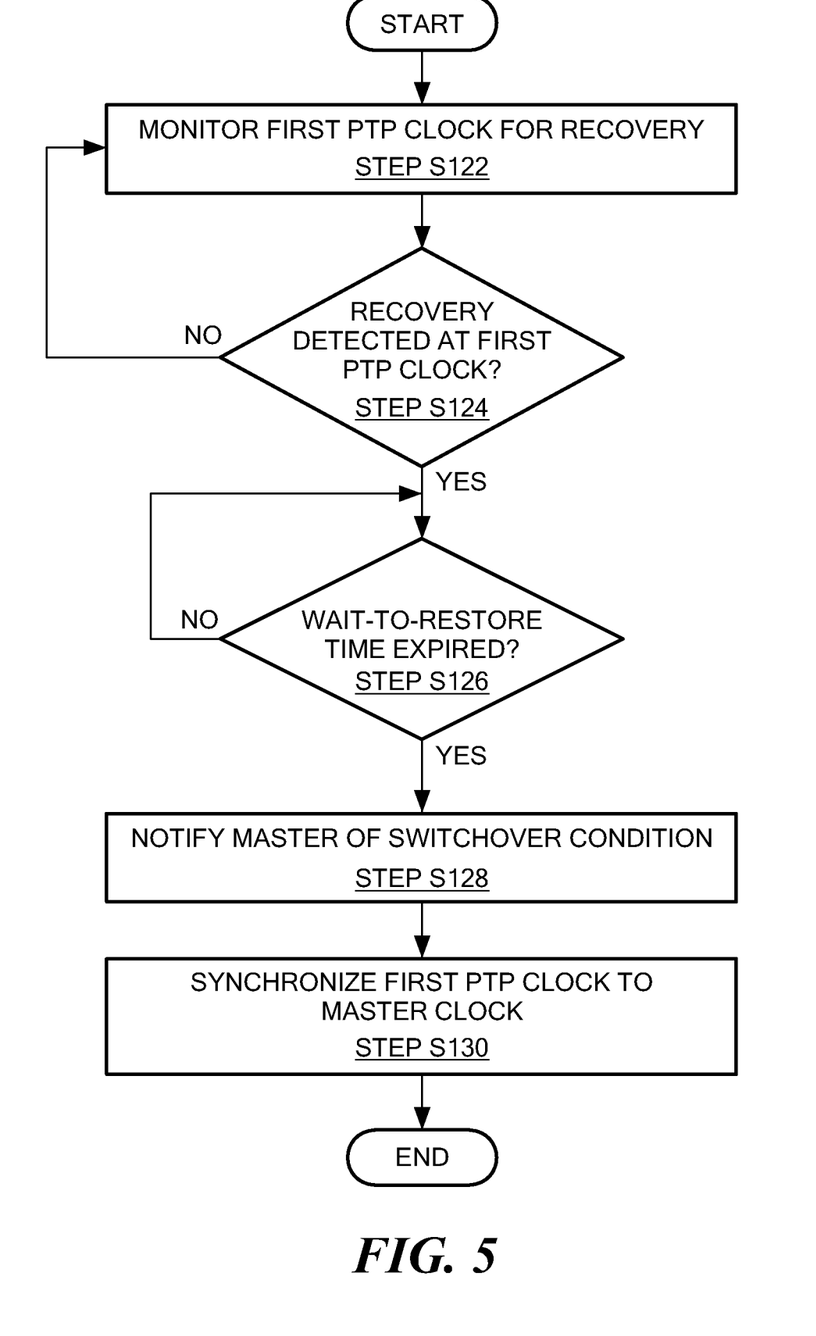
FIG. 5 is a flowchart of an exemplary process for switching back to a first PTP service instance from a second PTP service instance according to principles of the present invention.

An exemplary process for switching back to a first PTP service instance from a second PTP service instance is described with reference to FIG. 5. After switchover from the first PTP service instance 108a to the second PTP service instance 108b, the first PTP service instance 108a is monitored to detect if the first PTP service instance recovers (step S122). If the first PTP service instance 108a recovers (step S124), a determination is made as to whether a wait-to-restore timer has expired (step S126). If so, the master clock 104 is notified of a switchover condition (step S128). The first PTP service instance 108a is activated and synchronized to the master clock 104 (step S130).

Note that in some embodiments, the first PTP service instance 108a and the second PTP service instance 108b may share the same network address, the same MAC address, and/or the same port identification (ID). In this case, when a fault of the first PTP service instance 108a occurs, it may not be necessary to send the network address, MAC address or port ID of the second PTP service instance 108b to the master clock since this information will already be known to the master clock. In other embodiments, the PTP service instances may be located at different addresses within the same module or at different addresses of different network nodes, i.e., different physical communication network elements. In this case, the address and configuration data of the backup PTP service instance selected by the primary PTP service instance will be sent to the master clock by the primary PTP service instance in the event of a fault.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, e.g., a communication network node, having one or more processing elements, e.g., processors, and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of maintaining clock synchronization in a communication network having multiple clocks, the system further having at least a first precision time protocol, PTP, service instance and a second PTP service instance, the method comprising:
   periodically cloning dynamic PTP parameters and tuning PTP parameters from the first PTP service instance to the second PTP service instance substantially in real time;
   wherein when the first PTP service instance fails, the second PTP service instance is ready to replace the first PTP service instance with substantially the same dynamic and tuning PTP parameters and the first and second PTP service instances are different from a master clock.

2. The method of claim 1, further comprising:
detecting a fault associated with the first PTP service instance;
notifying a PTP master clock of a first switchover condition;
activating the second PTP service instance; and
synchronizing the second PTP service instance to the PTP master clock.

3. The method of claim 2, further comprising:
detecting recovery from the fault at the first PTP service instance;
waiting for a wait-to-restore time period to expire;
notifying the PTP master clock of a second switchover condition; and
synchronizing the first PTP service instance to the PTP master clock.

4. The method of claim 1, wherein the second PTP service instance is selected based on at least one of a priority attribute and an Internet protocol, IP, address.

5. The method of claim 2, wherein notifying the PTP master clock of a first switchover condition includes sending an address and configuration data of the second PTP service instance to the PTP master clock.

6. The method of claim 1, wherein the static PTP parameters include clock identity, clock quality, priority and domain number.

7. The method of claim 1, wherein the dynamic PTP parameters include clock type, and port state.

8. The method of claim 1, wherein the tuning parameters include phase offset, frequency offset and frequency drift.

9. The method of claim 1, further comprising duplicating, at the second PTP service instance, static PTP parameters of the first PTP service instance, the duplicating occurring at time of initialization of the first PTP service instance.

10. A communication system, comprising:
a first PTP clock comprising a first interface and a first memory on which are stored static parameters, dynamic parameters and real-time tuning parameters; and
a second PTP clock comprising a second interface and a second memory which stores static parameters determined at a time of initialization, and dynamic parameters and real-time tuning parameters received from the first PTP clock, through the second interface, periodically at subsequent times; wherein when the first PTP clock fails, the second PTP clock is ready to replace the first PTP clock with substantially the same dynamic and tuning PTP parameters and the first and second PTP clocks are different from a master clock.

11. The communication system of claim 10, wherein the first PTP clock and the second PTP clock have a same network address.

12. The communication system of claim 10, further comprising a master clock having an address and a configuration of the first PTP clock, the first PTP clock being synchronized to the master clock.

13. The communication system of claim 12, wherein the first PTP clock, the second PTP clock and the master clock are each located at different remote locations in a communication network.

14. The communication system of claim 10, wherein the second PTP clock is activated in an event of a fault of the first PTP clock.

15. The communication system of claim 14, wherein the second PTP clock is synchronized to the master clock in the event of the fault of the first PTP clock.

16. The communication system of claim 10, further comprising a third PTP clock having static parameters received from the first PTP clock at a first time and having dynamic parameters and real-time tuning parameters received from the first PTP clock periodically at subsequent times.

17. The communication system of claim 16, wherein the third PTP clock is activated when there is a fault in the first or second PTP clock.

18. A method for maintaining clock synchronization in a communication network having at least a first precision time protocol, PTP, clock instance, a second PTP clock instance and a master clock, the method comprising:
synchronizing the first PTP clock instance to the master clock; and
periodically copying dynamic PTP parameters and real-time tuning parameters from the first PTP clock instance to the second PTP clock instance; wherein when the first PTP clock instance fails, the second PTP clock instance is ready to replace the first PTP clock instance with substantially the same dynamic and tuning PTP parameters and the first and second PTP clock instances are different from the master clock.

19. The method of claim 18, further comprising:
detecting a fault associated with the first PTP clock instance;
notifying the master clock of a switchover condition;
synchronizing the second PTP clock instance to the master clock.

20. The method of claim 18, wherein the first PTP clock instance and the second PTP clock instance are selected based on a priority attribute.

21. A network node, comprising:
a memory, the memory arranged to store dynamic precision time protocol, PTP, parameters and real-time PTP tuning parameters;
an interface, the interface arranged to:
receive the dynamic PTP parameters and real-time PTP tuning parameters from a PTP service instance; and
receive an activation message; and
a local clock;
the network node being arranged to activate a backup PTP service instance and synchronize the local clock with a master clock upon receipt of the activation message, the backup PTP service instance being based at least in part on the dynamic PTP parameters and the real-time PTP tuning parameters received from the PTP service instance, the backup PTP service instance and the PTP service instance being different from the master clock.

* * * * *